US006760961B2

(12) United States Patent
Upadhya

(10) Patent No.: US 6,760,961 B2
(45) Date of Patent: Jul. 13, 2004

(54) PISTON MACHINING

(75) Inventor: Srinivasa K. Upadhya, Troy, MI (US)

(73) Assignee: Focus: Hope, Detroit, MI (US)

( * ) Notice: Subject to any disclaimer, the term of this patent is extended or adjusted under 35 U.S.C. 154(b) by 132 days.

(21) Appl. No.: 10/164,542

(22) Filed: Jun. 7, 2002

(65) Prior Publication Data

US 2003/0150112 A1 Aug. 14, 2003

Related U.S. Application Data

(60) Provisional application No. 60/356,276, filed on Feb. 12, 2002.

(51) Int. Cl.$^7$ .............................................. B23P 23/02
(52) U.S. Cl. ........................ 29/27 C; 29/888.04; 29/50; 82/122; 82/1.3; 82/114; 82/138; 279/2.12; 408/71; 409/165
(58) Field of Search .............................. 29/27 C, 27 R, 29/26 A, 335, 35.5, 50, 52, 53, 888.04, 888.041; 269/46, 48.3, 48.2, 48.1; 82/122, 1.3, 1.4, 1.5, 12, 106, 114, 120–121, 138, 154, 159; 279/2.12, 2.11, 2.1; 408/71, 31; 409/165, 192, 203, 213, 217

(56) References Cited

U.S. PATENT DOCUMENTS

| 2,348,819 | A | * | 5/1944 | Johnson ..................... 279/2.12 |
|---|---|---|---|---|
| 2,789,825 | A | * | 4/1957 | Drew ......................... 279/2.12 |
| 4,730,373 | A | * | 3/1988 | Senoh ......................... 29/26 A |
| 4,847,964 | A | * | 7/1989 | Adams et al. ........... 29/888.04 |
| 5,263,351 | A | * | 11/1993 | Berg, III ..................... 279/2.11 |
| 5,885,199 | A | * | 3/1999 | Shao ........................... 29/27 C |
| 6,062,117 | A | * | 5/2000 | Shoji ............................ 82/122 |
| 6,467,145 | B1 | * | 10/2002 | Porta ............................. 29/40 |

FOREIGN PATENT DOCUMENTS

DE          010034973 A1  *   2/2002

OTHER PUBLICATIONS

Editorial staff of Modern Machine Shop—Online Article at www.mmsonline.com/articles/1100bp3.html—Nov. 2000 "Better Production—High Speed Spindles Provide Focus for Single–Machine Piston Production".
Printed article in Modern Machine Shop, Nov. 2000, pp. 158–162 "Better Production—High Speed Spindles Provide Focus for Single–Machine Piston Production".

* cited by examiner

Primary Examiner—Erica Cadugan
(74) Attorney, Agent, or Firm—Dykema Gossett PLLC

(57) ABSTRACT

An apparatus and method of utilization thereof is provided for machining pistons of reciprocating piston internal combustion engines. The piston is held in a work station by its interior cavity and the oil rings, oval side surface and hinge pin bore are machined on the piston without any refixturing of the piston required.

5 Claims, 4 Drawing Sheets

PISTON MACHINING

CROSS-REFERENCE TO RELATED APPLICATIONS

This Application claims the benefit of U.S. Provisional Application Serial No. 60/356,276 filed Feb. 12, 2002, the disclosure of which is hereby incorporated by reference.

Certain portions of this invention were made with Government support under Contract Number DAAE 07-97-CY080 awarded by the U.S. Army Tank, Automotive Command. The Government has certain rights in this invention.

FIELD OF THE INVENTION

The field of the present invention relates to an apparatus and method for machining pistons for positive displacement machines. In particular, the present invention relates to an apparatus and method for machining pistons for internal combustion engines, especially pistons for engines with low volume requirements.

BACKGROUND OF THE INVENTION

A piston of an internal combustion engine includes a piston head having a top ring groove and an oil ring groove. A skirt is formed under the piston head. The skirt is connected to a connecting rod via a piston pin which is perpendicular to the center axis of the piston.

The piston executes a back and forth motion in the engine cylinder due to the combustion pressure force Fg of a combustion chamber formed in the cylinder above the piston head, and thereby rotates a crankshaft situated at a lower position, which is connected via the piston pin and connecting rod.

As the piston moves from top dead center to bottom dead center, the combustion pressure Fg applies a force Fc in an axial direction to the connection rod via the piston. A force Ft simultaneously acts on the piston in a horizontal direction according to the inclination angle of the connecting rod, and the skirt of the piston is pressed by this horizontal force Ft against the wall of the cylinder on a first side of the cylinder. When the piston rises from bottom dead center, the inertia of the crankshaft pushes the piston upward via the connecting rod, and the skirt of the piston is thereby pressed against the wall of the cylinder on the second side of the cylinder opposite the first side.

The piston skirt has the function of supporting the piston such that the latter does not lean due to the combustion energy acting upon it. The skirt tends to suffer more thermal expansion in a perpendicular direction to the piston pin due to the combustion heat of the engine. Therefore, it is typically formed with an elliptical cross-section having the piston pin as its short axis and the perpendicular direction as its long axis. The requirement of ovality in the machining of the piston skirt is one of the major challenges in the fabrication of pistons.

Although most vehicle manufacturers offer a large variety of vehicle and vehicle body styles, the types of engines offered by any vehicle manufacturer are extremely limited and tooling for building an engine typically will have a production run of seven years to a decade or more. In very high volumes, it is most practical when machining a piston to provide a separate station for virtually each operation.

Therefore, there will be one station to rough finish the side surface of the piston. There will be another station or stations to do the various machining operations upon the piston heads. There will be another station or stations to put in the top ring groove and the oil ring groove. There will be yet another station to provide the ovality to the skirt and still other stations to provide the bore for the piston pin.

Even minor changes in piston dimension and/or material can often require major changes in tooling. Therefore, changes to the piston design are avoided as much as possible.

The above-noted multi station method of machining pistons in high volume is suitable for large production runs. However, the multi station method of machining pistons is not advantageous when machining replacement parts where the production runs may not be in the hundreds of thousands or millions of pistons. Often, design changes which would lead to better functionality of the piston are avoided due to the capital costs incurred in the multi station method.

Another problem of the multi station method is that as the piston is moved from station to station, the piston work piece must be refixtured. Accuracy and/or time must be sacrificed to insure that the refixturing of the piston work piece is achieved correctly.

As previously mentioned, pistons have a top ring groove. The top ring groove seats a sealing ring. It is desirable for the top ring groove to be as close as possible to the end of the piston head. The further down the top ring groove is, the greater the amount of combustion volume wasted for a given piston cylinder combination.

A limiting factor of the placement of the top ring groove is the strength of the aluminum metal above the top ring groove and an extreme top end of the piston head. An increase in the strength of the piston would allow the portion of the piston head above the top ring groove to be lessened and therefore provide a more efficient piston.

To lower the amount of energy consumed by the engine and the reciprocal motion of the pistons, the pistons are typically made of a light metal such as aluminum. To increase the strength of the piston above top ring groove and also to lower the weight of the piston, certain composite products comprising an aluminum metal matrix and a strengthening or reinforcing phase such as ceramic particulars, whiskers, fibers or the like, have been brought forth. The composite pistons combine some of the stiffness and wear resistance of the reinforcing phase with the ductility and toughness of a metal matrix. The fibers, ceramics, or carbide inserts which are added to the aluminum increase the strength and/or lower the weight of the piston.

Lowering the weight of the piston by the use of composite products also increases the gas mileage of the vehicle the piston is utilized. Composites also can deform less than pure aluminum and can bring about better deformation characteristics. However, the materials utilized in the making of composite pistons can often snag a cutting tool when the piston is being machined. Therefore, the application of composite pistons has been limited due to the machining constraints.

It is desirable to provide an apparatus and method to economically machine small volume runs of pistons. It is desirable to economically machine composite pistons which have been reinforced with fiber ceramics or carbides. It is also desirable to provide an apparatus and method to economically machine pistons that can allow for design changes in the pistons without incurring substantial capital costs for retooling.

It is still further desirable to provide an economical apparatus and method for high volume piston machining wherein the major machine operations which take place on the piston are performed without refixturing the piston for different operations. Elimination or a reduction in refixturing pistons in the manufacturing process can greatly reduce the scrape rate experienced in the manufacturing of pistons.

SUMMARY OF THE INVENTION

To make manifest the above noted and other unfulfilled desires, a revelation of the present invention is brought forth. In a preferred environment, the present invention provides a method of machining a piston. The piston work piece is presented to a machining center in the form of a rough casting having an inner cavity. The piston is fixtured by grabbing the piston along the inner cavity. The piston is oriented in a vertical manner and rotated while a mill cutter rough cuts the side surface of a head and skirt of the piston. The finish cutting of the skirt of the piston is performed by an ovality unit with a cutter head which is translationally mounted with respect to the piston and moves toward and away from the center line of the piston as the piston is rotated along its longitudinal axis.

In cooperation with a multiple tool turret miller, the piston is rotated and the piston ring grooves are cut into the side surface of the piston. Optionally, the milling on the top head of the piston is also performed. The piston is then held stationary and a drill is utilized to cross-bore the piston to make the pin connection. The piston is then released with all or virtually all of the machining complete.

It is an object of the present invention to provide an apparatus and method for machining a piston without requiring that the piston be refixtured. It is an object of the present invention to provide an apparatus and method of machining a piston which is economical for pistons having small production runs. It is an object of the present invention to provide an apparatus and method of machining a piston wherein the design changes can quickly and easily be made without the requirement of extensive retooling.

The above noted and other objects of the present invention will become apparent to those skilled in the art from a review of the invention as it is provided in the accompanying drawings and detailed description of the preferred embodiment.

DETAILED DESCRIPTION OF THE DRAWINGS

Figure 1:
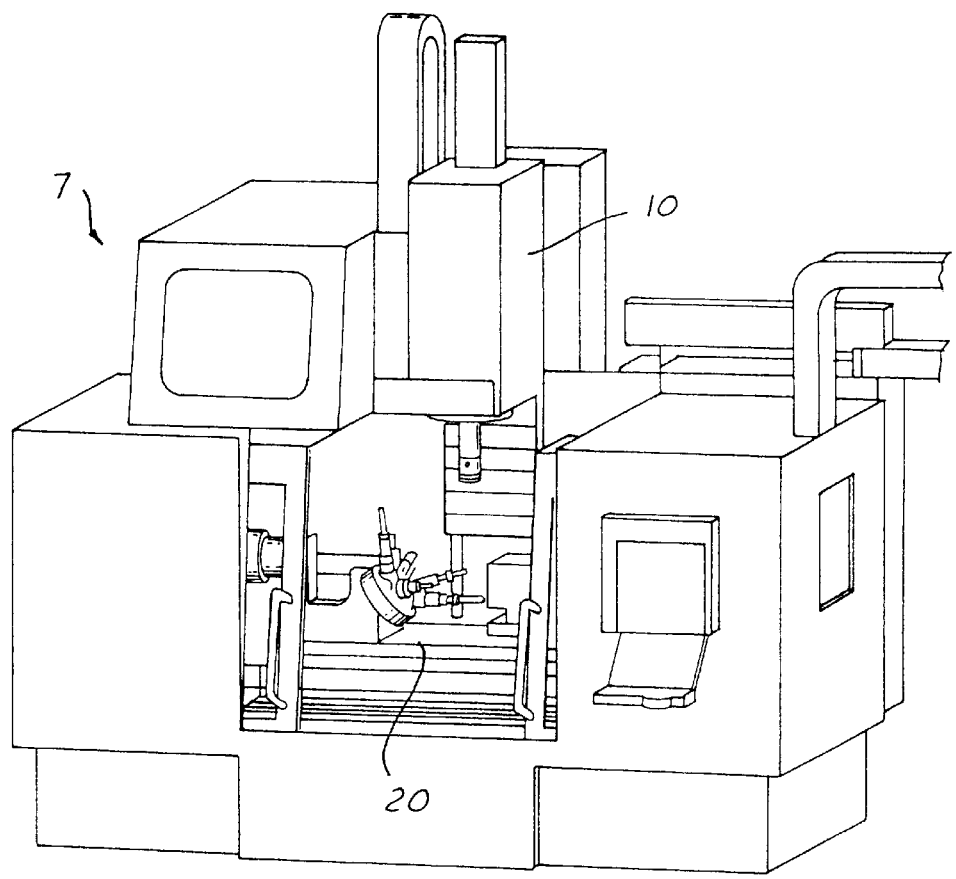
FIG. 1 is a front perspective view of a preferred embodiment piston machining apparatus according to the present invention.
Figure 3:
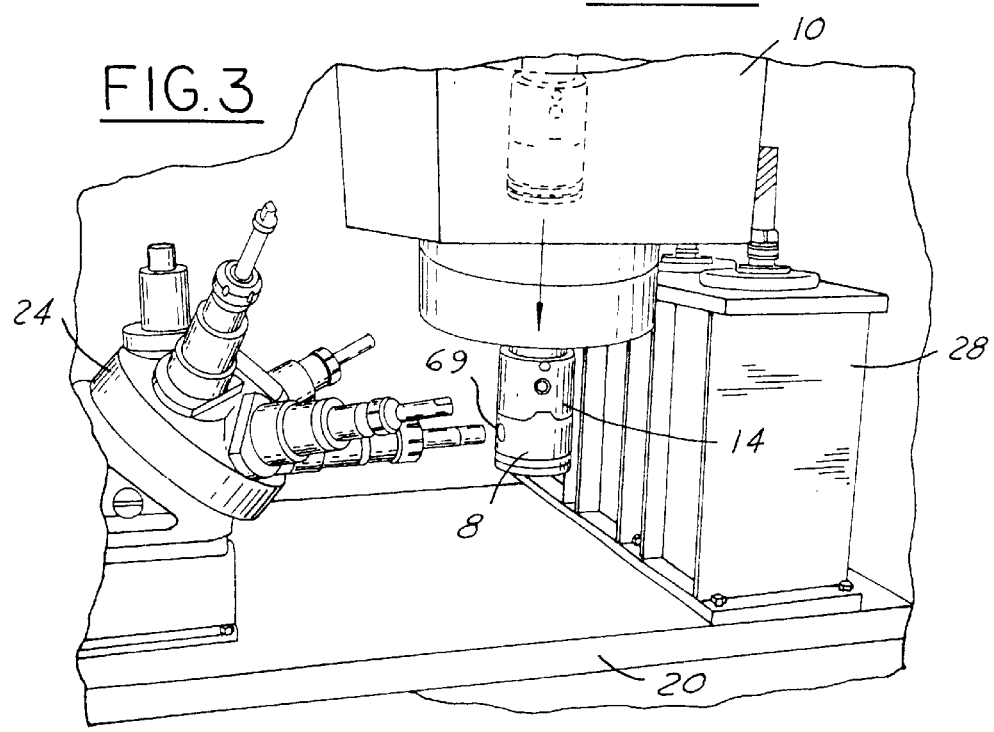
FIG. 3 is an enlarged perspective view illustrating another machining operation of the present invention.
Figure 2:
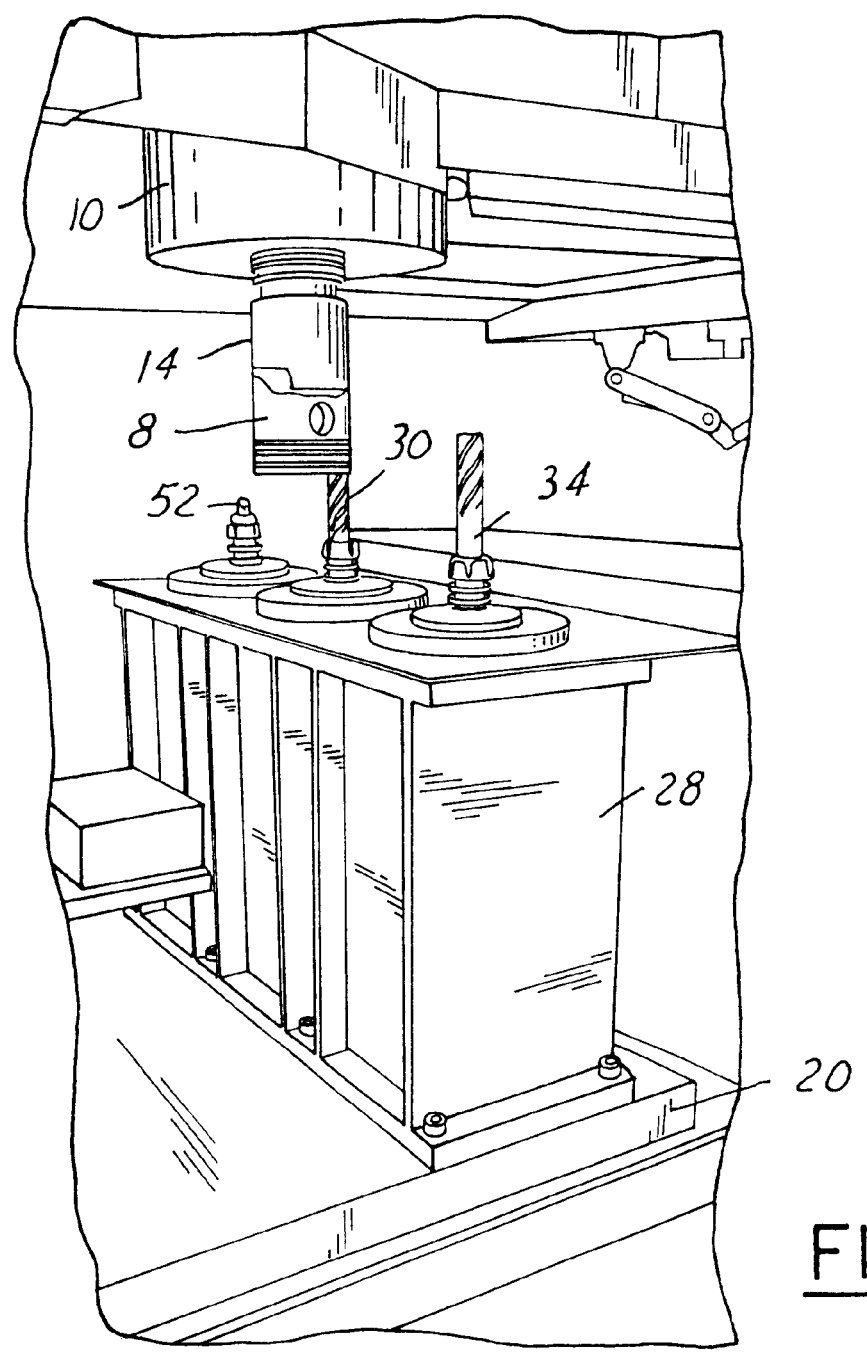
FIG. 2 is a perspective view illustrating one of the various operations of the piston machining apparatus of the present invention.
Figure 4:
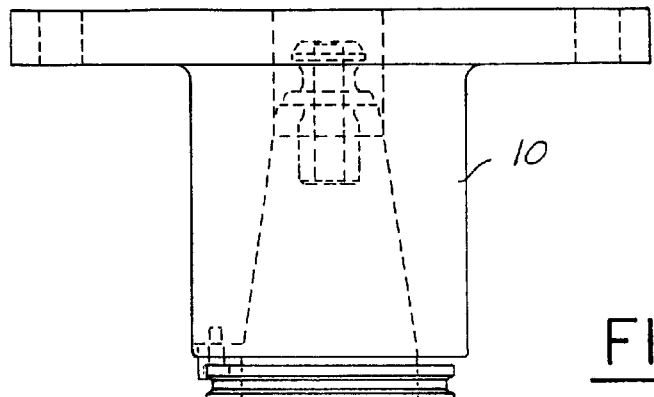
FIG. 4 is a side elevational view of the fixture utilized in holding the piston during the machining operations

Referring to FIGS. 1–3, 5–6, 8 and 11, the piston machining center 7 according to the present invention has several components. The first component is the spindle 10. The spindle can move up and down vertically approximately 770 mm centimeters. The spindle has a fixture 14 having two sliders 120. The sliders 120 can be extended outwardly to grasp an inner cavity of a rough piston 8 casting.

The spindle 10 is powered by a 25-horsepower, direct-drive, variable-speed AC-type electric motor and is capable of rotating the casting at speeds from 60 rpm to 6000 rpm. Positioned under the spindle 10 is a slide table 20. The slide table 20 can move in two axes to position a multi tool turret 24 to act upon the piston 8 casting or to position the stand 28 in proximity to the piston 8. The stand 28 has an end mill 30 (FIG. 2) which is utilized to machine part of the piston 8.

Figure 5:
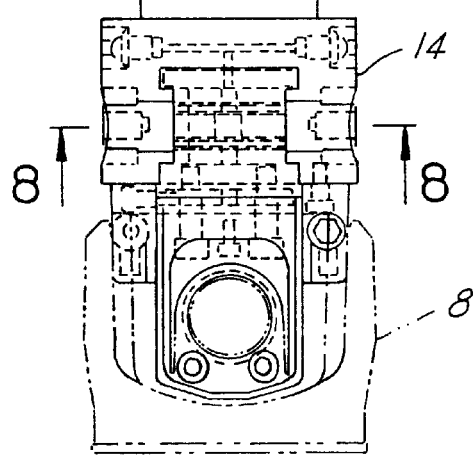
FIG. 5 is a top plan view of the portion of the machine utilized in machining the oval skirt of the piston.
Figure 5:
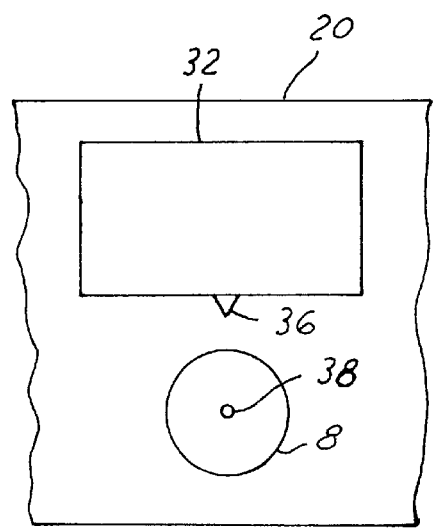
Figure 8:
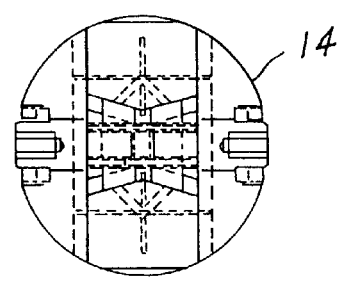
FIG. 8 is a view taken along lines 8—8 of FIG. 4.
Figure 6:
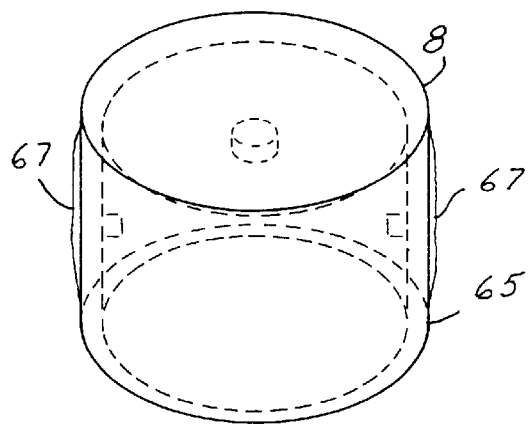
FIG. 6 is a perspective view of a rough casting of the piston.

Referring to FIG. 5, an ovality unit 32 has a base that is fixably connected with the slide table 20. The ovality unit has a diamond cutting tip 36 that is translated toward and away from the longitudinal center line 38 of the piston 8. The ovality unit 32 is synchronized with the spindle 10 to generate the desired oval or semi-oval shape upon the skirt of a piston 8.

It should be noted that the shape of the piston 8 is not a simple oval but changes along the length of the piston skirt to where on the top portion of the piston, the piston head, is essentially circular or slightly conical.

The operation of the machining unit 7 is as follows. A piston 8 rough casting is manually or robotically fed to the fixture 14. Sliders 120 of the fixture 14 will be actuated (in a manner to be later described) to pivot outwardly to capture the piston casting to the spindle 10. The table 20 will be moved to bring the end mill 30 in proximity to the spindle 10. The spindle will rotate at 2000 rpms or higher if possible and the end mill 30 will rough cut the exterior side surface of the piston, cutting off the flashes 67.

After the rough cutting operation on the side of the piston, the spindle 10 and table 20 will be moved to bring the end mill 30 for the finish cut operation. The spindle will rotate at its maximum speed approximately 6,000 rpms for the finish cut on the side of the piston surface. Non concentric cut-outs of the top of the piston will be machined by a cutting tool 52.

The end mill 30 is utilized to place a finished turn on the side surface 65 of the rough cut piston. This surface will typically be to a 125 micro in per su surface finish. The slide table 20 will move to bring the ovality unit 32 in proximity to the piston 8. The spindle 10 will rotate the piston at 500 rpm and the ovality unit 32 will finish turning the O.D. of the piston 8 putting an oval cross-section to the piston skirt.

The cutting tip 36 ovality unit 32 is a diamond tip cutting tool. After cutting by the ovality unit 32, the spindle 10 is moved to interact with the tools on the turret 24.

Figure 7:
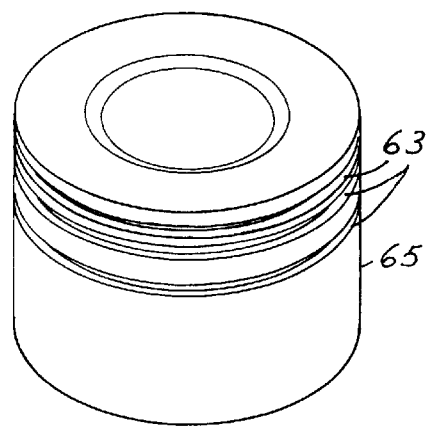
FIG. 7 is a perspective view of the machining upon the piston head.

In the first operation, a turret stationary tool is utilized to cut the piston ring grooves. The piston shown in FIG. 7 has three such grooves 63 although one has been eliminated for clarity of illustration. A brake is applied to the spindle 10 so that the piston 8 is held stationary. A live turret drill is applied to the piston 8 to rough turn the piston connection pin bore. A live spindle is then again used to cut the snap ring groove. Then another live turret is utilized to finish bore the connector pin groove.

Figures 10, 11:
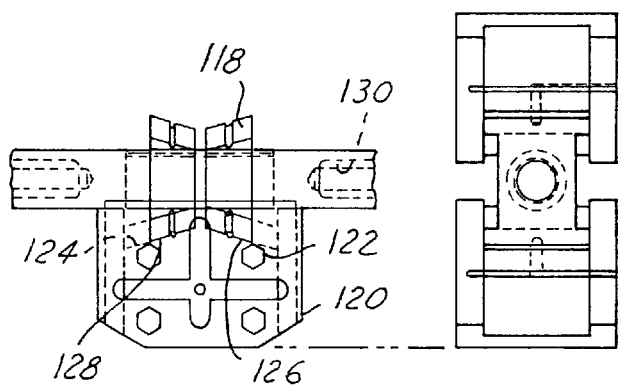
FIG. 10 is a side elevational view of the sliders, wedges and shaft with the second slider being shown.
FIG. 11 is a view similar to FIGS. 9 and 10 illustrating the slider being extended outward to engage with the interior surface of a piston cavity.
Figure 9:
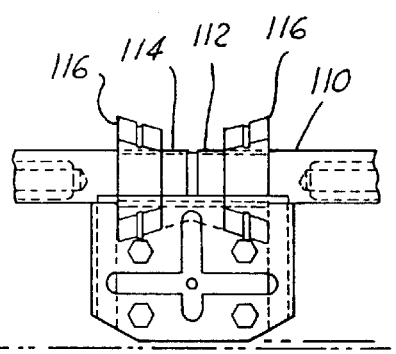
FIG. 9 is a broken away view taken of various components of the fixture including shaft wedges and slider in the fixture shown in FIGS. 4 and 8.

Referring to FIGS. 4, and 8–11, the fixture 14 includes a shaft 110. The shaft 110 has a first section 112 threaded in a first direction and a second section 114 threaded in an opposite direction. Threadably engaged upon the shaft are two wedges 116. Rotation of the shaft in a first given direction causes the wedges 116 to extend outwardly as shown in FIG. 9. Rotation of the shaft 110 in the opposite direction causes the wedges to translate towards one another as shown in FIG. 11.

The wedges 116 have shoes 118. The shoes 118 are captured in angled slots 122 and 124. The angled slots 122 and 124 have outboard surfaces 126 and 128 respectively.

Another slider identical to slider 120 is operatively associated with the opposite side of the wedges 116. Movement of the shaft 110 can cause the wedges to be translated inwardly or outwardly. The shaft 110 may be rotated by a fluid power connection (not shown) or may have drive openings 130 to be engaged by an appropriate tooling.

It is apparent to those skilled in the art that the function of the ovality unit can be delayed until after the finished cutting of the oil ring grooves 63 and on the side bore 69 associated with the pin bore.

The present inventive piston machining center and method of utilization has been shown in a preferred embodiment. However, it will be apparent to those skilled in the art that various modifications can be made to the present invention without departing from the spirit or scope of the present invention as it is encompassed in the specification and drawings and by the following claims.

I claim:

1. A machining center for machining a piston for a positive displacement machine, said piston being presented to said machining center in the form of a work piece of a rough casting having an inner cavity, said machining center comprising:
   a fixture for gripping said piston along said inner cavity of said piston;
   a spindle for rotating said piston about a vertical longitudinal axis of said piston, said spindle being translatable along a first axis;
   a slide table positioned underneath said spindle for moving a plurality of cutting tools into contact with said piston;
   said plurality of cutting tools comprising:
      a first cutting tool for milling said piston when said piston is rotated by said spindle;
      an ovality unit for moving a cutting tool toward and away from a center line of said piston in synchronization with the rotation of said piston to give said piston a non-circular cross-section;
   at least one non-rotating tool for cutting a groove in the outer diameter of said piston while said piston is being rotated by said spindle;
   and a second rotating cutting tool for cutting a cross bore through said piston orthogonal to the longitudinal piston axis to facilitate insertion of a connecting pin to said piston, said spindle holding said piston stationary during the cutting of said cross bore.

2. A machining center as described in claim 1, wherein said fixture includes a rotatable threaded shaft, at least one wedge threadably engaged with said shaft and moved thereby; said at least one wedge having sliding contact with at least one slider which is translated to engagement with an interior surface of said piston.

3. A machining center as described in claim 2, wherein the at least one wedge comprises two wedges threadably engaged on said shaft and wherein said two wedges forcibly engage said at least one slider.

4. A machining center as described in claim 2, wherein said at least one wedge retracts said at least one slider from an interior of said piston upon reversal of said shaft.

5. A machining center as described in claim 2, wherein said at least one sliders comprises two opposed sliders, and wherein said at least one wedge engages the two opposed sliders.

* * * * *